United States Patent Office 3,509,176
Patented Apr. 28, 1970

---

3,509,176
BASIC DERIVATIVES OF DIBENZO-OXEPINE
Werner Winter and Max Thiel, Mannheim, Kurt Stach and Wolfgang Schaumann, Mannheim-Waldhof, and Annemarie Ribbentrop, Mannheim, Germany, assignors to C. F. Boehringer & Soehne G.m.b.H., a corporation of Germany
No Drawing. Filed Mar. 23, 1967, Ser. No. 625,314
Claims priority, application Germany, Apr. 30, 1966, B 86,919
Int. Cl. C07d 9/00
U.S. Cl. 260—333
12 Claims

ABSTRACT OF THE DISCLOSURE

Novel dibenzo-oxepine derivatives having the formula:

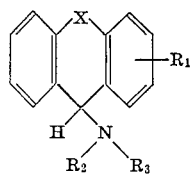

and the salts thereof with pharmacologically acceptable acids, wherein X is an oxymethylene group, $R_1$ is hydrogen or halogen, or a lower akyll, alkoxy, trifluoromethyl or alkylmercapto group and $R_2$ and $R_3$, which may be the same or different, are each a member of the group of hydrogen, alkyl, alkenyl, hydroxalkyl, alkoxyalkyl and acyloxyalkyl and groups in which

represents heterocyclic groups formed by joining $R_2$ and $R_3$ so that the nitrogen becomes part of the ring including the pyrrolidino, piperidino, morpholino and piperazino groups, and such groups substituted by alkyl, alkoxy, alkoxyalkyl, acyloxalkyl, aryl or aralkyl groups. The aforesaid compounds have been found to exhibit muscle-relaxing, tranquillizing and anti-convulsant activities.

---

This invention relates to novel chemical compounds and methods of preparing and using the same. More particularly, the invention is concerned with basic derivatives of dibenzo-oxepine and processes for producing and using such compounds.

According to the present invention, there is provided a novel class of dibenzo-oxepine derivatives of the formula:

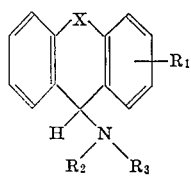

and the salts thereof with pharmacologically acceptable acids wherein X is an oxymethylene group, $R_1$ is hydrogen or halogen or a lower alkyl, alkoxy, trifluoromethyl or alkylmercapto group and $R_2$ and $R_3$, which may be the same or different, are each a member of the group of akyll, alkenyl, hydroxyalkyl, alkoxyalkyl, acyloxyalkyl and groups which $R_2$ and $R_3$ taken together with the nitrogen atom to which they are attached form a pyrrolidino, piperidino, morpholino or piperazino ring, which ring may be substituted by alkyl alkoxy, alkoxyalkyl, acyloxyalkyl, aryl or aralkyl groups.

These novel compounds constitute valuable therapeutic agents and are possessed of valuable pharmacological properties, exhibiting muscle-relaxing, tranquillizing and anti-convulsive activities.

The new compounds according to the present invention can be produced by reacting a compound of the formula:

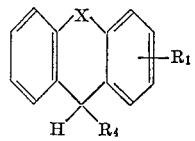

wherein $R_1$ and X have the significance previously assigned and $R_4$ is a chlorine or bromine atom or a tosyloxy group, with an amine of the formula:

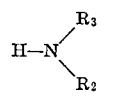

wherein $R_2$ and $R_3$ have the significance previously assigned, and the compounds obtained are then, if desired, converted by the conventional methods into their salts with pharmacologically compatible acids.

For carrying out the process according to the present invention, the compound (II) is preferably reacted in an inert solvent, such as tetrahydrofuran, with the amine (III). The reaction can be accelerated by heating.

In order to neutralize the liberated acid, the amine (III) can be used in excess. In the case of amines which are difficult to obtain and expensive, the reaction can also be carried out using equimolar amounts of the compounds (II) and (III) in which case there is added a corresponding amount of a tertiary amine, such as for example, the inexpensive and readily available triethylamine.

The isolation of the free amines (I) and the conversion thereof into salts with pharmacologically compatible acids takes place according to the known methods, for example, by the addition of ethereal hydrochloric acid to an ethereal solution of the free base.

The compounds having the Formula II used as starting materials are new compounds and can be obtained, using the conventional methods i.e., by the reaction of the corresponding carbinols of the formula:

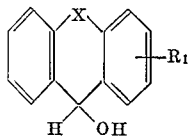

wherein $R_1$ and X have the significance previously assigned, with thionyl halides or tosyl halides. The carbinols (IV) are themselves obtained, in the known manner, by reduction of the corresponding dibenzo-oxepinones with complex metal hydrides.

A more comprehensive understanding of the invention can be obtained by referring to the following illustrative examples which are not intended, however, to be unduly limitative of the invention.

EXAMPLE 1

11-amino-6,11-dihydro-dibenzo-[b,e]-oxepine 0.05 mol 11-chloro-6,11-dihydro-dibenzo-[b,e]-oxepine wast introduced into a mixture of 100 ml. ether, 25 ml. tetrahydrofuran and about 75 ml. liquid ammonia. The resulting reaction mixture was stirred for four hours at the reflux temperature of the boiling ammonia and excess ammonia then allowed to evaporate off overnight. Any precipitated ammonium chloride which had formed was then filtered off with suction, the filtrate evaporated in a vacuum and the crude base isolated in the conventional manner. The base was then converted, in the usual manner, into the corresponding hydrochloride; M.P. 240–241° C.; yield 86 percent; M.P. of the free 11-amino-6,11-dihydro-dibenzo-[b,e]-oxepine 62–63° C.

The 11 - chloro - 6,11-dihydro-dibenzo-[b,e]-oxepine (M.P. 86–87° C.) used as starting material was obtained by the reaction of 11-hydroxy-6,11-dihydro-dibenzo-[b,e]-oxepine (M.P. 92–93° C.) with thionyl chloride in ether or benzene at room temperature. The 11-hydroxy-6,11-dihydro-dibenzo-[b,e]-oxepine was obtained by reduction of the corresponding dibenzo-oxepinone with sodium borohydride in methanol or with lithium aluminum hydride in ether.

The compounds set out in the following Table I were obtained in an analogous manner:

TABLE I

| Compound | Hydrochloride M.P.(°C.) | Yield, percent | 11-chloro-compound M.P.(°C.) | 11-hydroxy compound M.P.(°C.) |
|---|---|---|---|---|
| 2-methyl-11-amino-6,11-dihydro-dibenzo-[b,e]-oxepine | 182–184 | 87 | 118–120 | 95–96 |
| 2-methyl-11-amino-6,11-dihydro-dibenzo-[b,e]-oxepine | 213–214 | 91 | 129–130 | 77–78 |
| 2-chloro-11-amino-6,11-dihydro-dibenzo-[b,e]-oxepine | 210–11 | 79 | 128–130 | 137–138 |

EXAMPLE 2

11-methylamino-6,11-dihydro-dibenzo-[b,e]-oxepine

A mixture of 0.05 mol 11-chloro-6,11-dihydro-dibenzo-[b,e]-oxepine and 0.15 mol monomethylamine was dissolved in 100 ml. tetrahydrofuran and heated in an autoclave for 3 hours at 100° C. Subsequently, the precipitated hydrochloride of monomethylamine was filtered off with suction, the solvent evaporated off in a vacuum and the base precipitated out in the form of its hydrochloride by the addition of ethereal hydrochloric acid. The melting point of the hydrochloride of 11-methylamino-6,11-dihydro-dibenzo-[b,e]-oxepine was 212–213° C.; yield 75%.

The compounds set out in the following Table II were obtained in an analogous manner, the non-oily bases being recrystallized from benzine:

TABLE II

| Compound | Base M.P. (°C.) | Hydrochloride M.P. (°C.) | Yield, percent |
|---|---|---|---|
| 11-dimethylamino-6,11-dihydro-dibenzo-[b,e]-oxepine | 72–73 | 204–205 | 82 |
| 11-ethylamino-6,11-dihydro-dibenzo-[b,e]-oxepine | Oil | 197–198 | 72 |
| 11-isopropylamino-6,11-dihydro-dibenzo-[b,e]-oxepine | | 209–210 | 65.6 |
| 2-chloro-11-methylamino-6,11-dihydro-dibenzo-[b,e]-oxepine | 85–86 | 244–246 | *72 |
| 2-chloro-11-dimethylamino-6,11-dihydro-dibenzo-[b,e]-oxepine | 112–114 | 227–228 | 75 |
| 2-chloro-11-isopropylamino-6,11-dihydro-dibenzo-[b,e]-oxepine | | 240–242 | 70 |
| 2-methyl-11methylamino-6,11-dihydro-dibenzo-[b,e]-oxepine | | 225–226 | 71 |
| 2-methoxy-11-methylamino-6,11-dihydro-dibenzo-[b,e]-oxepine | | 251–252 | 85 |
| 2-methyl-11-dimethylamino-6,11-dihydro-dibenzo-[b,e]-oxepine | | 193–194 | 70 |
| 2-methoxy-11-dimethylamino-6,11-dihydro-dibenzo-[b,e]-oxepine | | 196–197 | 69 |
| 2-methyl-11-isopropylamino-6,11-dihydro-dibenzo-[b,e]-oxepine | | 221–222 | 83 |
| 2-methoxy-11-isopropylamino-6,11-dihydro-dibenzo-[b,e]-oxepine | | 216–217 | 76 |

*The 11-chloro compound had a melting point of 128–130° C. and the 11-hydroxy compound a melting point of 137–138° C.

EXAMPLE 3

11-diethylamino-6,11-dihydro-dibenzo-[b,e]-oxepine

A mixture of 0.05 mol 11-chloro-6,11-dihydro-dibenzo-[b,e]-oxepine and 0.1 mol diethylamine was boiled for 3 hours in 100 ml. tetrahydrofuran. The reaction mixture was then allowed to cool and worked up in the manner described in the previous examples. The hydrochloride of 11 - diethylamino-6,11-dihydro-dibenzo-[b,e]-oxepine was obtained in a yield of 93 percent and had a melting point of 157–158° C. The free base was recovered as oil.

The compounds set out in the following Table III are obtained in an analogous manner, the non-oily bases being recrystallized from benzine.

TABLE III

| Compound | Base, M.P. (°C.) | Hydrochloride, M.P. (°C.) | Yield, percent |
|---|---|---|---|
| 11-hydroxyethylamino-6,11-dihydro-dibenzo-[b,e]-oxepine | Oil | 182–183 | 81 |
| 11-allylamino-6,11-dihydro-dibenzo-[b,e]-oxepine | | 183–184 | 82 |
| 11-pyrrolidino-6,11-dihydro-dibenzo-[b,e]-oxepine | 110–111 | 210–212 | 79 |
| 11-piperidino-6,11-dihydro-dibenzo-[b,e]-oxepine | 81–84 | 192–194 | 93 |
| 11-(4-methyl-piperidino)-6,11-dihydro-dibenzo-[b,e]-oxepine | 120–122 | 185–187 | 80 |
| 11-morpholino-6,11-dihydro-dibenzo-[b,e]-oxepine | 138–140 | 179–180 | 86 |
| 2-chloro-11-diethylamino-6,11-dihydro-dibenzo-[b,e]-oxepine | | 187–188 | 81 |
| 2-chloro-11-allylamino-6,11-dihydro-dibenzo-[b,e]-oxepine | | 195–197 | 88.5 |
| 2-chloro-11-hydroxyethyl-amino-6,11-dihydro-dibenzo-[b,e]-oxepine | | 202–204 | 62 |
| 2-chloro-11-piperidino-6,11-dihydro-dibenzo-[b,e]-oxepine | 145–146 | 161–163 | 84 |
| 2-chloro-11-morpholino-6,11-dihydro-dibenzo-[b,e]-oxepine | 165–166 | 160–162 | 78 |

EXAMPLE 4

2-chloro-11-(4-methoxy-piperidino)-6,11-dihydro-dibenzo-[b,e]-oxepine 0.05 mol 2-chloro-11-chloro-6,11 - dihydro - dibenzo-[b,e]-oxepine was boiled for 3 hours with 0.055 mol 4-methoxy-piperidine and 0.1 mol triethylamine in 100 ml. tetrahydrofuran. The reaction mixture was then allowed to cool and then worked up in the manner described in Example 3. There was obtained, the hydrochloride of 2-chloro-11-(4-methoxy-piperidino)-6,11-dihydro - dibenzo-[b,e]-oxepine in 88 percent yield; M.P. 160–162° C. The free base had a melting point of 123–124° C.

The compounds set out in the following Table IV were obtained in an analogous manner:

TABLE IV

| Compound | Base M.P. (°C.) | Hydrochloride, M.P. (°C.) | Yield, percent |
|---|---|---|---|
| 11-(4-methyl-piperazinyl-1)-6,11-dihydro-dibenzo-[b,e]-oxepine | | ¹148 | 82 |
| 11-(4-phenyl-piperazinyl-1)-6,11-dihydro-dibenzo-[b,e]-oxepine | 137–139 | 130 | 66.85 |
| 11-(4-methoxy-piperidino-1)-6,11-dihydro-dibenzo-[b,e]-oxepine | 103–104 | 130–135 | 56.9 |

¹ Decomp.

In order to confirm the pharmacological properties i.e., muscle-relaxing, tranquilizing and anti-convulsant activities, the following procedures were carried out:

(1) Sedative effect.—The potentiation of the narcotic effect of urethane, which is a measure of the sedative effect of a compound, was determined. The procedure was carried out by injecting mice with the test compounds in varying amounts. 15 minutes thereafter, 1 g./kg. of urethane was given intraperitoneally. The above amount of urethane constitutes a subnarcotic dose, as a result of which animals who have received no further medication will merely assume a side reclining position. The doses of the test compounds were determined which after an additional 15 minutes caused 50% of the experimental animals to assume a back-reclining position.

(2) Anti-Convulsant effect.—The inhibition of the cardiazol-extension spasm was evaluated as a measure of the anti-convulsant activity of the test compounds. 10 mice were used for each dose level. The test compounds were administered intraperitoneally and 30 minutes later 150 m./kg. of Cardiazol (pentamethylene-tetrazol) was given subcutaneously. Administration of Cardiazol alone has the effect apart from the elicited tonically clonic spasms in producing an extension spasm of the hindlegs which is readily apparent to the observer. The inhibition of this latter extension spasm was determined for each of the test compounds and as reported in the table as ED50, the latter having been calculated according to Litchfield and Wilcoxon.

The results of the above procedure are set out in the table which follows. As a comparison test compound, there is included in the table the known anti-epileptic agent Luminal.

(A) 11-amino-6,11-dihydro-dibenzo-[b,e]-oxepine.
(B) 2-methyl-11-amino-6,11-dihydro-dibenzo-[b,e]-oxepine.
(C) 2-methoxy-11-amino-6,11-dihydro-dibenzo-[b,e]-oxepine.
(D) 11-methylamino-6,11-dihydro-dibenzo-[b,e]-oxepine.
(E) 11-dimethylamino-6,11-dihydro-dibenzo-[b,e]-oxepine.
(F) 11-ethylamino-6,11-dihydro-dibenzo-[b,e]-oxepine.
(G) 11-isopropylamino-6,11-dihydro-dibenzo-[b,e]-oxepine.
(H) 2-chlor-11-dimethylamino-6,11-dihydro-dibenzo-[b,e]-oxepine.
(I) 11-diethylamino-6,11-dihydro-dibenzo-[b,e]-oxepine.
(J) 11-hydroxyethylamino-6,11-dihydro-dibenzo-[b,e]-oxepine.
(K) 11-allylamino-6,11-dihydro-dibenzo-[b,e]-oxepine.
(L) 2-chlor-11-diethylamino-6,11-dihydro-dibenzo-[b,e]-oxepine.
(M) 2-chlor-11-amino-6,11-dihydro-dibenzo-[b,e]-oxepine.
(N) 2-methoxy-11-methylamino-6,11-dihydro-dibenzo-[b,e]-oxepine.
(O) 2-methoxy-11-dimethylamino-6,11-dihydro-dibenzo-[b,e]-oxepine.
(P) 2-methoxy-11-isopropylamino-6,11-dihydro-dibenzo-[b,e]-oxepine.
(Q) Luminal (5-phenyl-5-ethyl-barbituric acid).

TABLE V

| Compound | Urethane narcotic potentiation | Inhibition of cardiazol extension spasm |
| --- | --- | --- |
| | ED$_{50}$ (mg./kg. mouse i.p. 30 min. p.i.) | |
| A | 18 | 9.1 |
| B | >20 | 11.3 |
| C | >20 | 8.9 |
| D | 8.0 | 5.5 |
| E | 5.4 | 4.6 |
| F | 18 | 6.2 |
| G | 13 | 8.0 |
| H | >40 | 11.2 |
| I | 25 | 12 |
| J | 38 | 10 |
| K | 39 | 13 |
| L | >50 | 9.8 |
| M | 20 | 8.8 |
| N | 4.9 | 3.8 |
| O | 1.8 | 2.8 |
| P | 7 | 4.1 |
| Q | 52 | 13 |

As can be seen from the table, the compounds in accordance with the invention exhibit anti-convulsive activity having a more or less active sedative component. The compounds in accordance with the invention therefore possess a similar effect to that of the known compound Luminal, but as can be seen from the table, are more effective than is that compound for the effect sought to be achieved.

Pharmaceutically acceptable acid addition salts of the present invention can be prepared from the dibenzo-oxepine derivatives by conventional methods. For example, the free base can be dissolved in an aqueous solution of the appropriate acid and the salt can be insolated by evaporation of the solution. Alternatively, the free base dissolved in an organic solvent such as methanol, ethanol, ethylacetate, ether and the like, can be treated with the appropriate acid and according to the nature of the solvent employed, the desired salt will separate spontaneously or can be precipitated by the addition of a solvent in which the salt is insoluble. Suitable acids include hydrochloric, sulfuric, hydrobromoic, phosphoric, tartaric, acetic, citric, succinic, maleic, benzoic, salicylic and the like.

As indicated hereinbefore, the compounds of the present invention are useful for the treatment of conditions associated with convulsive phenomena and as relaxing and tranquillizing agents, and for this purpose the active compounds are associated with a pharmaceutically acceptable carrier in a form suitable for administration both perorally or parenterally.

For example, for oral administration the active compounds can be administered in liquid or solid dosage forms. Solid forms include capsules, tablets, powders, pills and the like and the liquid forms include suitably flavored aqueous suspensions and solutions (depending on concentration desired) and flavored oil suspensions and solutions wherein edible oils such as corn oil, cotton seed oil, coconut oil, peanut oil, sesame oil or mixtures of these and the like can be employed.

For preparing compounds such as tablets and other compressed formulations, the compounds can include any compatible and edible tableting material used in pharmaceutical practice as for example, corn starch, lactose, stearic acid, magnesium stearate, talc, methyl cellulose and the like.

Similarly, the compounds of the present invention can be mixed with suitable adjuvants for the preparation of resorbable hard gelatin or soft capsules utilizing conventional pharmaceutical practices.

Further, the compounds can be employed in the form of their solutions or suspensions suitable for parenteral administration.

The dosage of the novel compounds of the present invention for the treatment of the conditions as set out above, depends on the age, weight and condition of the patient being treated. Generally speaking, for adult oral administration, the preferred unit dosage is 1 mg.–50 mg. of active compound with a suitable pharmaceutical diluent and/or lubricant.

I claim:
1. A member selected from the group consisting of compounds of the formula

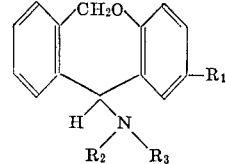

wherein $R_1$ is a member selected from the group consisting of hydrogen, chloro, methyl, and methoxy, $R_2$ is a member selected from the group consisting of hydrogen, lower alkyl containing up to 3 carbon atoms, allyl and hydroxyethyl and $R_3$ is a member seelcted from the group consisting of hydrogen and lower alkyl containing up to 3 carbon atoms and salts thereof with pharmacologically acceptable acids.

2. A compound according to claim 1, designated 11-amino-6,11-dihydro-dibenzo-[b,e]-oxepine.

3. A compound according to claim 1, designated 2-methyl-11-amino-6,11-dihydro-dibenzo-[b,e]-oxepine.

4. A compound according to claim 1, designated 2-methoxy-11-amino-6,11-dihydro-dibenzo-[b,e]-oxepine.

5. A compound according to claim 1, designated 11-methylamino-6,11-dihydro - dibenzo - dibenzo-[b,e]-oxepine.

6. A compound according to claim 1, designated 11-dimethylamino-6,11-dihydro-dibenzo-[b,e]-oxepine.

7. A compound according to claim 1, designated 11-ethylamino-6,11-dihydro-dibenzo-[b,e]-oxepine.

8. A compound according to claim 1, designated 11-isopropylamino-6,11-dihydro-dibenzo-[b,e]-oxepine.

9. A compound according to claim 1, designated 2-chlor-11-dimethylamino-6,11-dihydro - dibenzo-[b,e]-oxepine.

10. A compound according to claim 1, designated 2-methoxy-11-methylamino-6,11-dihydro - dibenzo - [b,e]-oxepine.

11. A compound according to claim 1, designated 2-methoxy-11-dimethyl-amino-6,11-dihydro-dibenzo -[ b,e]-oxepine.

12. A compound according to claim 1, designated 2-methoxy-11-isopropyl-amino - 6,11 - dihydro - dibenzo-[b,e]-oxepine.

References Cited

UNITED STATES PATENTS

| | | | |
|---|---|---|---|
| 3,177,202 | 4/1965 | Kreighbaum et al. | 260—294.7 X |
| 3,215,692 | 11/1965 | Bonvicino et al. | 260—294.7 X |
| 3,401,165 | 9/1968 | Yonan | 260—333 X |

NORMA S. MILESTONE, Primary Examiner

U.S. Cl. X.R.

260—247.7, 268, 294.7, 326.5; 424—248, 250, 267, 274, 278

PO-1050
(5/69)

UNITED STATES PATENT OFFICE
CERTIFICATE OF CORRECTION

Patent No. 3,509,176      Dated April 28, 1970

Inventor(s) Werner Winter, Max Thiel, Kurt Stach and Wolfgang Schaumann

It is certified that error appears in the above-identified patent and that said Letters Patent are hereby corrected as shown below:

Col. 1, line 26, "akyll" should be -- alkyl --.

Col. 2, line 67, "wast" should be -- was --.

Col. 3, Table II, Heading of second column should be -- °C --, not "(6°).

Column 6, line 72, delete "dibenzo" either occurrence.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents